US011797350B2

(12) United States Patent
Goergen et al.

(10) Patent No.: US 11,797,350 B2
(45) Date of Patent: Oct. 24, 2023

(54) METHOD AND APPARATUS FOR PROVIDING DATA CENTER FUNCTIONS FOR SUPPORT OF AN ELECTRIC VEHICLE BASED DATA CENTER

(71) Applicant: CISCO TECHNOLOGY, INC., San Jose, CA (US)

(72) Inventors: Joel Richard Goergen, Soulsbyville, CA (US); Kameron Rose Hurst, Sonora, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 629 days.

(21) Appl. No.: 16/871,877

(22) Filed: May 11, 2020

(65) Prior Publication Data

US 2021/0264068 A1   Aug. 26, 2021

Related U.S. Application Data

(60) Provisional application No. 62/981,339, filed on Feb. 25, 2020.

(51) Int. Cl.
*G06F 9/50* (2006.01)
*G06Q 10/0631* (2023.01)

(52) U.S. Cl.
CPC .......... *G06F 9/5072* (2013.01); *G06F 9/5027* (2013.01); *G06Q 10/0631* (2013.01); *G06Q 10/06315* (2013.01); *G06F 2209/502* (2013.01); *G06F 2209/505* (2013.01)

(58) Field of Classification Search
CPC .................................................... G06F 9/5072
See application file for complete search history.

(56) References Cited

U.S. PATENT DOCUMENTS

| 7,566,987 | B2 | 7/2009 | Black et al. |
| 7,774,457 | B1* | 8/2010 | Talwar ................. G06F 9/5072 709/224 |
| 8,068,937 | B2 | 11/2011 | Eaves |
| 8,638,008 | B2 | 1/2014 | Baldwin et al. |
| 8,768,528 | B2 | 7/2014 | Millar et al. |
| 8,781,637 | B2 | 7/2014 | Eaves |
| 9,003,492 | B2* | 4/2015 | Katar ..................... H04L 67/51 726/4 |
| 9,171,268 | B1 | 10/2015 | Penilla et al. |

(Continued)

FOREIGN PATENT DOCUMENTS

| CN | 203773464 U | 8/2014 |
| WO | 2011078397 A1 | 6/2011 |

OTHER PUBLICATIONS

*Voltserver Inc.*, v. *Cisco Technology, Inc.*, "Decision Denying Institution of Post-Grant Review," United States Patent and Trademark Office, PGR2021-00055, U.S. Pat. No. 10,735,105 B2, Aug. 19, 2021, 25 pages.

(Continued)

*Primary Examiner* — Charlie Sun

(57) ABSTRACT

In one embodiment, a method includes identifying a plurality of servers located in a plurality of electric vehicles, associating the servers with an electric vehicle based cloud data center, allocating resources to the servers in the electric vehicle based cloud data center to perform data center functions, and managing the servers in the electric vehicle based cloud data center.

20 Claims, 12 Drawing Sheets

(56) References Cited

U.S. PATENT DOCUMENTS

| | | |
|---|---|---|
| 9,184,795 B2 | 11/2015 | Eaves |
| 9,231,998 B2 | 1/2016 | Lu et al. |
| 9,419,436 B2 | 8/2016 | Eaves et al. |
| 9,834,102 B2 | 12/2017 | Nakaya |
| 9,853,689 B2 | 12/2017 | Eaves |
| 9,893,521 B2 | 2/2018 | Eaves |
| 10,166,882 B2 | 1/2019 | Yang et al. |
| 10,263,526 B2 | 4/2019 | Sandusky et al. |
| 10,442,300 B2 | 10/2019 | Huston |
| 10,468,879 B2 | 11/2019 | Eaves |
| 10,532,667 B2 | 1/2020 | Chen |
| 10,541,543 B2 | 1/2020 | Eaves |
| 10,714,930 B1 | 7/2020 | Weiss et al. |
| 10,735,105 B2 | 8/2020 | Goergen et al. |
| 2011/0057612 A1 | 3/2011 | Taguchi et al. |
| 2011/0283119 A1 | 11/2011 | Szu et al. |
| 2012/0043935 A1 | 2/2012 | Dyer et al. |
| 2012/0324245 A1 | 12/2012 | Sinha et al. |
| 2013/0304863 A1 | 11/2013 | Reber |
| 2014/0361745 A1 | 12/2014 | Nishita et al. |
| 2015/0301547 A1 | 11/2015 | Johansson |
| 2016/0294500 A1 | 10/2016 | Chawgo et al. |
| 2016/0294568 A1 | 10/2016 | Chawgo et al. |
| 2017/0229886 A1 | 8/2017 | Eaves |
| 2018/0018007 A1 | 1/2018 | Dorn et al. |
| 2018/0098201 A1 | 4/2018 | Torello et al. |
| 2018/0111494 A1 | 4/2018 | Pennilla et al. |
| 2018/0123360 A1 | 5/2018 | Eaves |
| 2018/0313886 A1 | 11/2018 | Mlyniec et al. |
| 2019/0280895 A1 | 9/2019 | Mather et al. |
| 2022/0063429 A1 | 3/2022 | Goergen et al. |
| 2022/0085603 A1 | 3/2022 | McNamara et al. |
| 2022/0134901 A1 | 5/2022 | Wang |
| 2022/0190587 A1 | 6/2022 | Eaves et al. |
| 2022/0305927 A1 | 9/2022 | Haas et al. |

OTHER PUBLICATIONS

*Voltserver Inc.*, v. *Cisco Systems, Inc.*, "Patent Owner's Preliminary Response to Post Grant Review Under 35 U.S.C. § 312 and 37 C.F.R. § 42.107," United States Patent and Trademark Office, PGR2021-00055, U.S. Pat. No. 10,735,105, 2021, Jun. 2, 2021, 51 pages.

"Effects of current on human beings and livestok—Part 1: General aspects," Technical Specification, Basic Safety Publication, IEC/TS 60479-1, Edition 4.0, Jul. 2005, 122 pages.

"Information technology equipment—Safety—Part 1: General requirements," International Standard, IEC 60950-1, Edition 2.2, May 2013, pp. 1-61, 63 pages.

"Information technology equipment—Safety—Part 1: General requirements," International Standard, IEC 60950-1, Edition 2.2, May 2013, pp. 62-122, 61 pages.

"Information technology equipment—Safety—Part 1: General requirements," International Standard, IEC 60950-1, Edition 2.2, May 2013, pp. 123-181, 59 pages.

"Information technology equipment—Safety—Part 1: General requirements," International Standard, IEC 60950-1, Edition 2.2, May 2013, pp. 182-253, 72 pages.

"Information technology equipment—Safety—Part 1: General requirements," International Standard, IEC 60950-1, Edition 2.2, May 2013, pp. 254-319, 66 pages.

"Information technology equipment—Safety—Part 1: General requirements," International Standard, IEC 60950-1, Edition 2.2, May 2013, pp. 320-377, 58 pages.

"Information technology equipment—Safety—Part 1: General requirements," International Standard, IEC 60950-1, Edition 2.2, May 2013, pp. 378-433, 56 pages.

"Information technology equipment—Safety—Part 1: General requirements," International Standard, IEC 60950-1, Edition 2.2, May 2013, pp. 434-490, 57 pages.

"Information technology equipment—Safety—Part 1: General requirements," International Standard, IEC 60950-1, Edition 2.2, May 2013, pp. 491-551, 61 pages.

"Information technology equipment—Safety—Part 1: General requirements," International Standard, IEC 60950-1, Edition 2.2, May 2013, pp. 552-622, 71 pages.

"Information technology equipment—Safety—Part 1: General requirements," International Standard, IEC 60950-1, Edition 2.2, May 2013, pp. 623-644, 24 pages.

"Low-voltage switchgear and controlgear—Part 1: General rules," International Standard, Amendment 2, IEC 60947-1, Edition 5.0, Sep. 2014, pp. 1-63, 65 pages.

"Low-voltage switchgear and controlgear—Part 1: General rules," International Standard, Amendment 2, IEC 60947-1, Edition 5.0, Sep. 2014, pp. 64-102, 41 pages.

Stephen Edelstein, "Updated 2016 Tesla Model S also gets new 75-kWhbattery option," Internet Archive WayBack Machine, Green Car Reports, May 5, 2016, 3 pages.

Stephen S. Eaves, "Network Remote Powering using Packet Energy Transfer," IEEE Xplore, Proceedings of IEEE International Conference on Telecommunications Energy (INTELEC) 2012, 978-1-4673-1000, Sep. 30-Oct. 4, 2012, 4 pages.

"Audio/video, information and communication technology equipment—Part 1: Safety requirements," International Standard, IEC 62368-1, Edition 2.0, Feb. 2014, pp. 1-132, 134 pages.

"Audio/video, information and communication technology equipment—Part 1: Safety requirements," International Standard, IEC 62368-1, Edition 2.0, Feb. 2014, pp. 133-263, 131 pages.

"Audio/video, information and communication technology equipment—Part 1: Safety requirements," International Standard, IEC 62368-1, Edition 2.0, Feb. 2014, pp. 264-387, 124 pages.

"Audio/video, information and communication technology equipment—Part 1: Safety requirements," International Standard, IEC 62368-1, Edition 2.0, Feb. 2014, pp. 388-508, 121 pages.

"Audio/video, information and communication technology equipment—Part 1: Safety requirements," International Standard, IEC 62368-1, Edition 2.0, Feb. 2014, pp. 509-593, 85 pages.

"Audio/video, information and communication technology equipment—Part 1: Safety requirements," International Standard, IEC 62368-1, Edition 2.0, Feb. 2014, pp. 594-676, 85 pages.

"National Electrical Code," National Fire Protection Association (NFPA) 70, 2017, 881 pages.

*Voltserver Inc.*, v. *Cisco Technology, Inc.*, "Declaration of David A. Durfee, Ph.D.," United States Patent and Trademark Office, PGR2021-00055, U.S. Pat. No. 10,735,105, Feb. 16, 2021, 340 pages.

David A. Durfee Ph.D., "Curriculum Vitae," 4 pages.

Adel S. Sedra, "Microelectronic Circuits," Sedra/Smith, Oxford University Press, Seventh Edition, 2015, 38 pages.

Charles k. Alexander, et al., "Fundamentals of Electric Circuits," McGraw Hill Education, Indian Edition 5e, 2013, 37 pages.

Andrew S. Tanenbaum, "Computer Networks," Prentice Hall PTR, Third Edition, 1996, 12 pages.

William Stallings, "Data and Computer Communications," Macmillan Publishing Company, Fourth Edition, 1994, 14 pages.

B.P. Lathi, et al., "Modem Digital and Analog Communication Systems," Oxford University Press, Fourth Edition, 2009, 15 pages.

*Voltserver Inc.*, v. *Cisco Technology, Inc.*, "Petition for Post Grant Review of U.S. Pat. No. 10,735,105," United States Patent and Trademark Office, PGR2021-00055, U.S. Pat. No. 10,735,105, Feb. 16, 2021, 132 pages.

Stephen H. Hall, et al., "High-Speed Digital System Design: A handbook of Interconnect Theory and Design Practices,", John Wiley & Sons, Inc., 2000, 55 pages.

"Understanding 802.3at, PoE Plus Standard Increases Available Power," Microsemi, Jun. 2011, 7 pages.

"Digital Electricity Gen2 Detailed Installation Manual," Voltserver Digital Electricity, Rev B.1, Nov. 29, 2017, 68 pages.

Berkeley Lab ETA, "Touch-Safe, High Voltage Digital Electricity Transmission using Packet Energy Transfer," Vimeo, https://vimeo.com/172469008, Mar. 8, 2016, 8 pages.

(56) References Cited

OTHER PUBLICATIONS

*Voltserver Inc.*, v. *Cisco Technology, Inc.*, "Decision Denying Institution of Post-Grant Review," United States Patent and Trademark Office, PGR2021-00056, U.S. Pat. No. 10,735,105 B2, Aug. 23, 2021, 18 pages.
*Voltserver Inc.*, v. *Cisco Technology, Inc.*, "Patent Owner's Preliminary Response to Post Grant Review Under 35 U.S.C. § 312 and 37 C.F.R. § 42.107," United States Patent and Trademark Office, PGR2021-00056, U.S. Pat. No. 10,735,105, 2021, Jun. 2, 2021, 46 pages.
*Voltserver Inc.*, v. *Cisco Technology, Inc.*, "Declaration of Stephens S. Eaves," United States Patent and Trademark Office, PGR2021-00056, U.S. Pat. No. 10,735,105, Feb. 16, 2021, 7 pages.
"Electrical—Computer Conference Proceedings," Internet Archive WayBack Machine Search for Intelec 2012, Curran Associates, Inc., http://www proceedings.com/electrical-computer-proceedings.html, 2012, 125 pages.
"Part VII: A Summary of Commonly Used MARC 21 Fields," Marc, Understanding MARC, https://www.loc.gov/marc//umb/um07to10.html, retrieved from Internet Feb. 13, 2021, 17 pages.
LC Catalog-Browse, https://catalog.loc.gov/vwebv/searchBrowse, retrieved from the Internet Feb. 12, 2021, 1 page.
"International Telecommunications Energy Conference: [proceedings] (Marc Tags)," Library Catalog, https://catalog.loc.gov/vwebv/staffView?searchId=3877&recPointer=0&recCount=25&searchType=1&bibId=11348322, retrieved from the Internet Feb. 12, 2021, 3 pages.
*Voltserver Inc.*, v. *Cisco Technology, Inc.*, "Petition for Post Grant Review of U.S. Pat. No. 10,735,105," United States Patent and Trademark Office, PGR2021-00056, U.S. Pat. No. 10,735,105, Feb. 16, 2021, 116 pages.
"International Telecommunications Energy Conference: [proceedings] (Full Record)," Library Catalog, https://catalog.loc.gov/vwebv/holdingsInfo?searchId=3810&recPointer=0&recCount=25&searchType=1&bibId=11348322, retrieved from the Internet Feb. 12, 2021, 4 pages.

\* cited by examiner

METHOD AND APPARATUS FOR PROVIDING DATA CENTER FUNCTIONS FOR SUPPORT OF AN ELECTRIC VEHICLE BASED DATA CENTER

STATEMENT OF RELATED APPLICATION

The present application claims priority from U.S. Provisional Application No. 62/981,339, entitled METHOD AND APPARATUS FOR PROVIDING DATA CENTER FUNCTIONS FOR SUPPORT OF AN ELECTRIC VEHICLE BASED DATA CENTER, filed on Feb. 25, 2020. The contents of this provisional application are incorporated herein by reference in its entirety.

TECHNICAL FIELD

The present disclosure relates generally to data centers, and more particularly, to an electric vehicle based data center.

BACKGROUND

Data centers are very expensive to build and land for data centers is also expensive. Construction costs are often very high and permits may take years to obtain. Cooling costs and building maintenance costs are also high. Power distribution into and through the facility may be difficult to obtain and may not deliver full capacity operation. Server replacement and upgrades are often time consuming and require a significant amount of labor. Thus, start-up and maintenance costs for a very large data center may be prohibitive in many cases.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
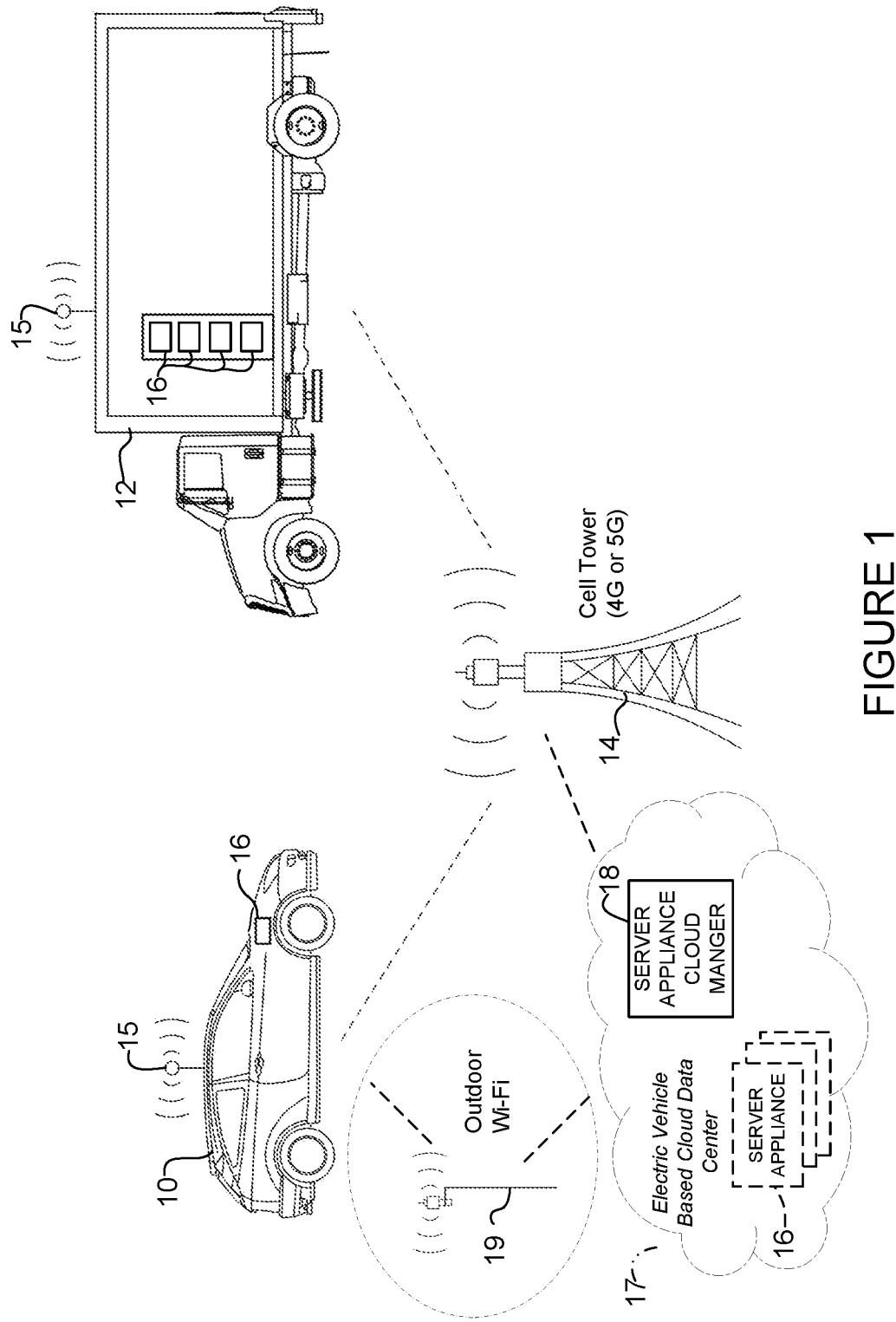
FIG. 1 is an example of an electric vehicle based data center, in accordance with one embodiment.

In one embodiment, a method generally comprises identifying a plurality of servers located in a plurality of electric vehicles, associating the servers with an electric vehicle based cloud data center, allocating resources to the servers in the electric vehicle based cloud data center to perform data center functions, and managing the servers in the electric vehicle based cloud data center.

In another embodiment, a method generally comprises identifying an operating environment at an electric vehicle comprising a plurality of servers operable to perform data center functions in an electric vehicle based cloud data center comprising a plurality of electric vehicle servers, and adjusting server resources at the electric vehicle based on the operating environment.

In yet another embodiment, a server appliance generally comprises a plurality of servers, a router in communication with the servers, an electrical interface for receiving power from an electric vehicle battery, and a wireless interface for communication with an electric vehicle based cloud data center in which the servers are configured to operate, wherein the server appliance is configured for mounting in an electric vehicle and the electric vehicle based cloud data center comprises a plurality of electric vehicle servers mounted in a plurality of electric vehicles.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Data center costs are driven by power (required power, backup power, electrical and power distribution equipment), land and building costs (construction, maintenance, permits, taxes), cooling costs (cooling equipment and power to drive the cooling equipment), network connectivity (e.g., fiber optic connections), and repair, infrastructure maintenance, and upgrade costs. If a data center is placed in an electric vehicle, many of these requirements and costs may be eliminated. For example, use of an electric vehicle based data center in place of a conventional data center eliminates the cost of land, building infrastructure, local and backup power, and wiring and cabling costs for fixed server racks. Maintenance and server updates may be performed during regularly scheduled electric vehicle maintenance and software updates.

The embodiments described herein provide methods, systems, and apparatus for implementing an electric vehicle based data center. In one or more embodiments, one or more servers are placed along with a router and cellular/wireless system to transmit and receive data at an electric vehicle to create an electric vehicle based data center. In one or more embodiments, the server appliance is managed in a communications network (e.g., cloud based management system) as the electric vehicle moves or remains stationary. Resources (e.g., processing, storage) may be allocated based on location of the electric vehicles or density of the electric vehicles in a specified zone, for example. In one or more embodiments, server resources may be adjusted based on an operating environment of the electric vehicle, including for example, driving distance, zone operation, temperature (internal or external), power availability, electric vehicle usage, terrain elevation, vehicle loading, projected usage, or any combination of these or other variables. The electric vehicle based data center allows for the electric vehicle owner to maintain the servers, provide power, and upgrade the server appliance. Land and construction costs are eliminated and minimal costs are built into the electric vehicle. The electric vehicle based data center eliminates the need for a conventional fixed (stationary) data center and makes the data center servers fully mobile.

As described in detail below, one or more embodiments provide a method and apparatus for incorporating control, power, cooling, security, and communications to support the electric vehicle based data center. The adaptation of power, cooling, and communications for data center usage are performed in conjunction with basic functions that are needed in an electric vehicle. In one or more embodiments, a control system manages limited resources and assigns resources to fill appropriate needs at any given time, environment, or operational needs of the electric vehicle. In one or more embodiments, system functionality covers power load shedding that allows the electric vehicle to have the power needed for its original purpose, while the data center is a secondary function.

In one or more embodiments, a method for providing data center functions for support of an electric vehicle based cloud data center includes identifying servers located in electric vehicles, associating the servers with the electric vehicle based cloud data center, allocating resources to the servers in the electric vehicle based cloud data center to perform data center functions, and managing the servers in the electric vehicle based cloud data center. As described below, identification of electric vehicle servers for resource allocation may be based on an estimated number of electric vehicles in a zone or region. One or more cloud managers may be used to associate the servers with the electric vehicle based cloud data center (e.g., perform network communications therewith), allocate resources, and manage the servers (e.g., move resources between servers).

Referring now to the drawings, and first to FIG. 1, an electric vehicle (EV) based cloud data center 17 (also referred to herein as an electric vehicle based data center or an electric vehicle based cloud managed data center), is shown in accordance with one embodiment. One or more servers (server blades) are located in an electric vehicle (car 10, truck 12) and interface with a cell tower 14 (e.g., 4G, 5G tower point) through an antenna 15. The server (or servers) and associated components (e.g., router and wireless module described below with respect to FIG. 3) are referred to herein as a server appliance 16 and may be installed in any suitable location within the electric vehicle 10, 12. As described below with respect to FIG. 4, the truck 12 may comprise a plurality of server appliances 16 in a server appliance rack. The electric vehicle based cloud data center 17 is managed by a server appliance cloud manager 18. As described in detail below with respect to FIG. 10, the server appliance cloud manager 18 may comprise any number of components such as zone managers or regional managers that may communicate with a central office. As shown in FIG. 1, one or more of the electric vehicles may also be in communication with the server appliance cloud manager 18 through Wi-Fi 19 (e.g., outdoor Wi-Fi or other access point (AP) in Wi-Fi network).

The server appliance cloud manager operates 18 in the electric vehicle based cloud managed data center 17, which distributes data center functions (e.g., collecting, storing, processing, distributing, or allowing access to data) to a plurality of servers (in server appliances 16) located in a plurality of electric vehicles 10, 12. The electric vehicle based data center 17 may provide services including, for example, data storage, data backup and recovery, data processing, data management, data networking, and other services. As described below, the electric vehicle based cloud managed data center 17 allocates resources (e.g., processing, memory, local storage, services, network connectivity, or other computing resources) to the servers within the server appliances 16 and may utilize, for example, virtual machines to move resources between servers, microservices for applications, orchestration to manage applications, or any other virtualization tools or virtualized infrastructure that supports applications and workloads across the physical servers and into a cloud environment.

The electric vehicle based cloud data center 17 may provide data functions to support and operate as an enterprise data center, hyperscale data center, telecom data center, managed services data center, or any other type of data center. The electric vehicle based data center 17 may include any number of servers (e.g., 500, 1,000, 5,000, 10,000, >10,000, or any other number of servers).

It is to be understood that the network shown in FIG. 1 is a simplified schematic and the network may include any number of server appliances 16 located in any number of electric vehicles 10, 12 in wireless communication over any number of cell towers 14, Wi-Fi networks 19, or other wireless communication stations. Furthermore, the electric vehicles 10, 12 shown in FIG. 1 are only examples and any type of electric vehicle may be used with one or more server appliances positioned in any suitable location within the vehicle. The antenna 15 extending from the vehicles 10, 12 as illustrated in FIG. 1 is shown to depict wireless transmission. As is well known by those skilled in the art, the antenna may be positioned in any location on the vehicle (e.g., trace on window). Also, while a box located towards a front end of the vehicle 10, 12 is shown to depict the server appliance 16, it is to be understood that the server appliance may be cubic or any other suitable shape to allow space for other needs or functions of the electric vehicle and may be positioned in any location in which sufficient space is available in the electric vehicle. The server appliance 16 may also be configured such that servers or server appliances may be easily added or removed depending on space availability within the electric vehicle for applications such as the truck 12 in which available space may vary depending on the usage. The server appliance 16 may be modular, customer maintained, operable with low power usage, and easily upgraded.

As a result of the server appliances 16 being mobile, the number of available servers in a specified cell range or zone may vary over time. As described below, calculations may be performed to determine available servers in a specified cell tower range at any given time and server loading zones, for which processing may be moved to, may be identified. The following describes example calculations for use in allocating resources among servers within the electric vehicle based cloud managed data center 17.

Figure 2A:
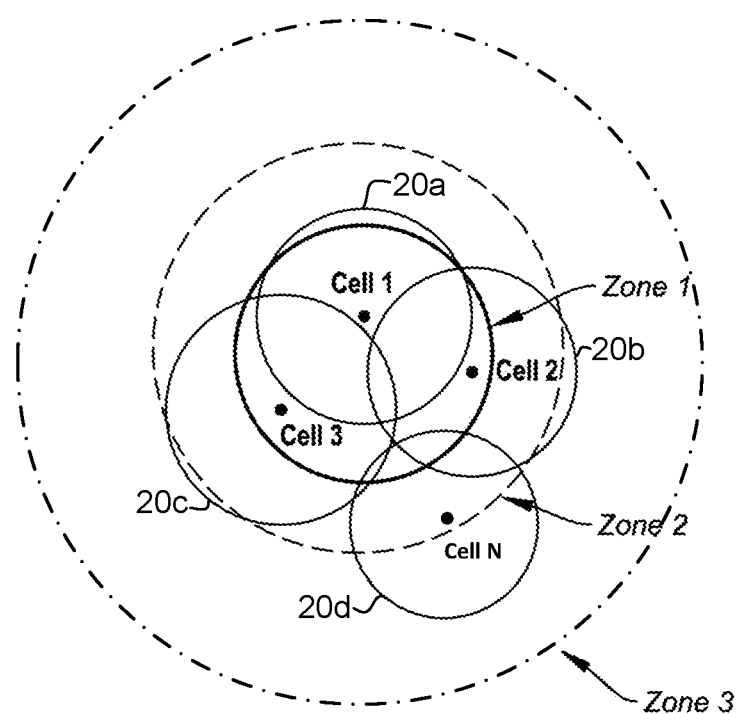
FIG. 2A illustrates an example of cell tower zones in which one or more electric vehicles may be located.

Electric vehicles such as cars 10 typically remain within a particular region or zone (e.g., residential neighborhood, geographical region surrounding home and work or home and school). It is therefore possible to predict server density within a zone. FIG. 2A illustrates an example of cell towers (cell 1, cell 2, cell 3), each having a specified range defined by circles 20a (for cell 1), 20b (for cell 2), 20c (for cell 3), and 20d (for cell N). Each cellular zone 20a, 20b, 20c, 20d is located in one or more regional zones (zone 1, zone, zone 3), which includes overlapping cell tower coverage. Each cell tower may be in more than one zone and each zone may include any number of cell towers. As shown in the example of FIG. 2A, zone 2 includes zone 1, and zone 3 includes zone 1 and zone 2. It is to be understood that FIG. 2A is only an example and each regional zone may include any number of cell towers.

As previously noted, most electric cars stay within a geographical region. In one example, $X_1\%$ of all electric vehicles in zone 1 may remain in that zone at least 95% of the time. Similarly, 99% of the electric vehicles may remain in zone 2 and 99.9% of the electric vehicles remain in zone 3, for example. At any given time, there would be $X_N\%$ of electric vehicles with servers in a zone N, which would provide a reliable load distribution in clusters for a cell tower.

Figure 2B:
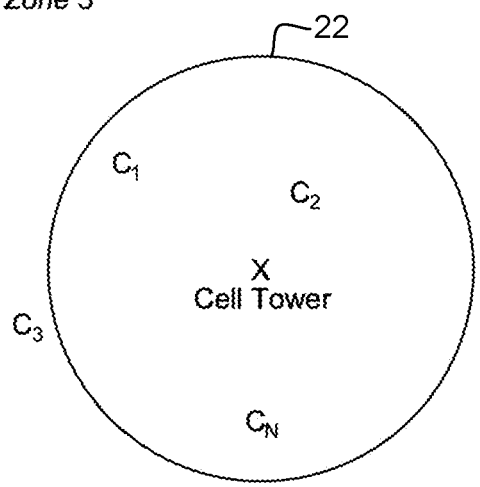
FIG. 2B illustrates charging station locations relative to a cell tower zone.

In one example, the placement of servers or electric vehicle density may be determined by the availability of charging points within a cellular zone. For example, as shown in FIG. 2B, a cell tower coverage area 22 includes N charging stations ($C_1$, $C_2$, $C_N$), with charging station $C_3$ located just outside of its coverage area 22.

Figure 2C:
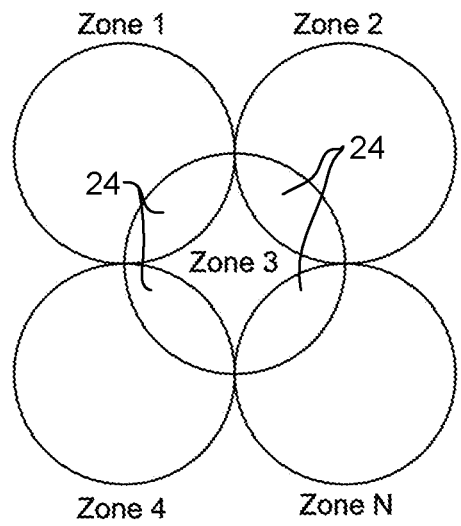
FIG. 2C illustrates resource allocation zones, in accordance with one embodiment.

In one or more embodiments, resources may be allocated to a plurality of resource zones (zone 1, zone 2, zone 3, zone 4, zone N) based on the number of charging stations in the resource zone (FIG. 2C). In one example, $Y_N$ represents the number of charging stations and the probability (P) of keeping electric vehicles in the zone may be expressed as:

$$P=[1-Y/Y_N]$$

Wherein:
Y is the number of charging stations in use; and
$Y_N$ is the total number of charging stations in a zone.
The fewer and more powerful charging stations may drive the greatest density of electric vehicles in a cellular zone (or zones).

In one or more embodiments, resources (e.g., storage and processing resources) may be allocated to the servers located in the zone with overlap 24 between the zones taken into account. In one example, a percentage of resources ($Z_3$) to be allocated in zone 3 of FIG. 2C may be calculated as follows:

$$Z_3 = \left[\sum_1^4 (16\%)\right]_{max} + [100 - 16\% \times (4 \text{ zones})]_{min}$$

$$Z_N = 100 - (16)_{overlap}$$

for each overlap.

In the above example, the percentage of resource allocation for zone 3 is based on a 16% overlap with each of the other four zones ($Z_1$, $Z_2$, $Z_4$, $Z_N$). It is to be understood that this is only an example and a different number of zones or percentage overlap may be used.

In one or more embodiments, initial calculations may be used to estimate a server density and machine learning may be used to determine available electric vehicle resources and update the calculations over time.

Figure 3:
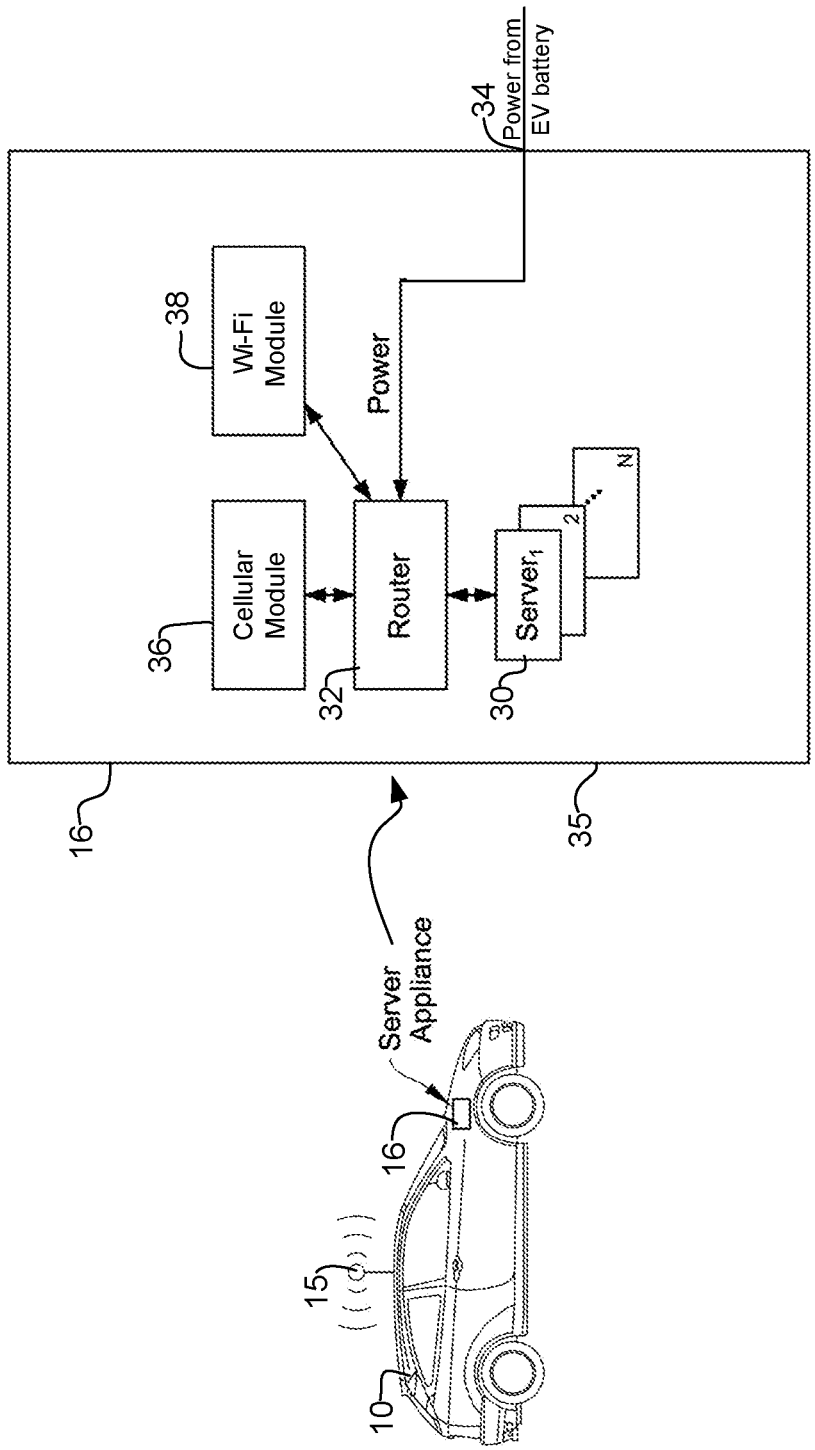
FIG. 3 illustrates details of a server appliance installed in the electric vehicle, in accordance with one embodiment.

Referring now to FIG. 3, a block diagram illustrating components of the server appliance 16 is shown in accordance with one embodiment. The server appliance 16 may be in wireless communication with the cell tower 14 or Wi-Fi device 19, as previously described (FIGS. 1 and 3). The server appliance 16 may include, for example, one or more servers 30 (server$_1$, server$_2$, . . . server$_N$) in communication with a router 32. The router 32 is in communication with a wireless module (interface) (e.g., cellular module 36 (e.g., 4G/5G), Wi-Fi module 38) for communication with the electric vehicle based cloud data center in which the servers 30 are configured to operate. The server appliance 16 further includes an electrical interface (power interface) 34 for receiving power from the electric vehicle (EV) battery. In the example shown in FIG. 3, power is received at the router 32, which distributes power to the other components. Power may be delivered, for example, as PoE (Power over Ethernet) or ESP (Extended Safe Power)/FMP (Fault Managed Power) (pulse power or multi-phase pulse power with safety features) as described in U.S. patent application Ser. No. 16/671,508 ("Initialization and Synchronization for Pulse Power in a Network System"), filed Nov. 1, 2019.

The server appliance 16 is contained within a housing 35 configured for mounting in the electric vehicle 10. As previously described, the housing 35 may be any shape suitable to fit within available space in the car, preferably without significant impact to operating features of the electric vehicle (e.g., trunk space, vehicle weight). As described below with respect to FIG. 4, the housing for one or more server appliances in a truck may be referred to as a server appliance rack. The server appliance or server appliance rack is preferably configured for ease of installment, modification (e.g., changing number of servers or server appliances based on space availability), or server maintenance or upgrade. The housing 35 may be configured for receiving cooling air through an air inlet or fan, as described below with respect to FIGS. 7A and 8.

It is to be understood that the term 'server appliance' as used herein may refer to any type of structure comprising multiple servers (server blades) and related components and configured for mounting in an electric vehicle.

Figure 4:
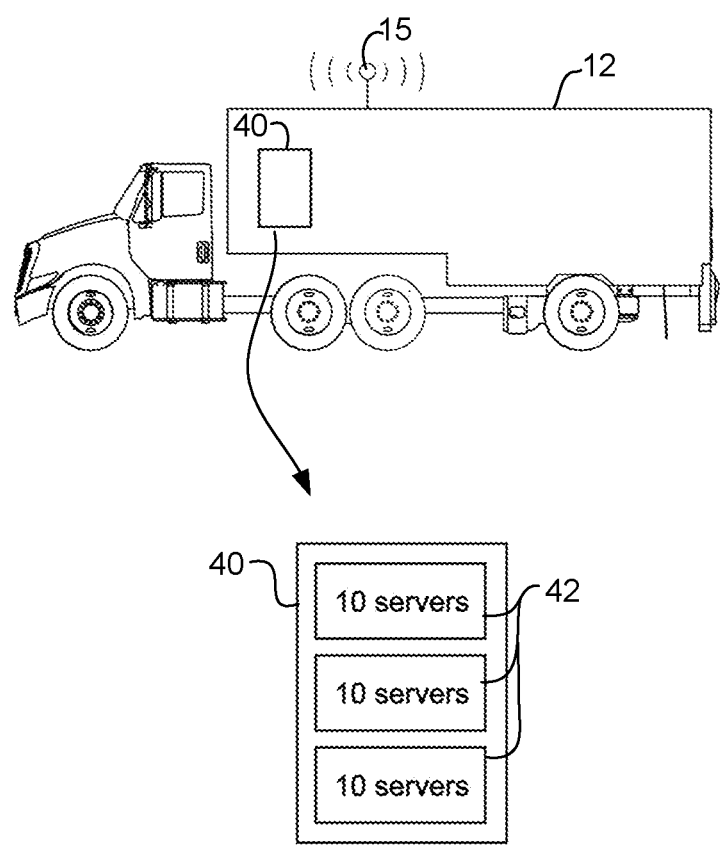
FIG. 4 illustrates a server appliance rack installed in an electric truck, in accordance with one embodiment.

FIG. 4 illustrates an example of the electric truck 12 that may be used in local areas or interstate trucking. The electric truck 12 may include a server appliance rack 40 comprising a plurality of servers managed as a group. For truck applications, servers may be organized in a ten piece server group 42 (or other size group) with independent cellular and Wi-Fi transceivers, for example. This allows for independent updates of each server group (appliance) 42. For short haul, resource allocation for servers in a truck may be handled as described above for local electric vehicles. For long haul, resource allocation may be downloaded at the start of computation and uploaded to the cloud manager at a new location.

Servers or server appliances may be powered down when not in use. Electric vehicle owners may also modify server usage. For example, an electric vehicle owner may allocate energy based on expected future driving. In one or more embodiments, the owner may deny use of servers during a long trip to conserve battery power. For short trips, full use of servers may be permitted. In another example, active server count may be reduced upon leaving a zone or based on battery life and battery temperature. As described below, a controller at the server appliance may automatically adjust server resources (active server count) based on an operating environment of the electric vehicle.

In one or more embodiments, a method for managing the servers at the electric vehicle may include identifying an operating environment at the electric vehicle and adjusting server resources at the electric vehicle based on the operating environment. For example, server usage may be adjusted based on driving distance, driving terrain or conditions, temperature (internal to or outside of the electric vehicle), available power, server power requirements, server type, or any combination of these or other factors. Adjustment of server resources may include reducing or increasing a number of active servers at the electric vehicle.

In one or more embodiments, server appliance load may be shed (number of active servers reduced) based on driving conditions and location. For example, as described below, server load may need to be adjusted to account for temperature changes based on location of the electric vehicle or temperature at the battery or server. Also, based on driving conditions, the electric vehicle may need more power for its driving functions (e.g., based on estimated trip distance, driver performance (habits), changes in terrain or grade of road, elevation change, electric vehicle weight, vehicle loading), thereby leaving less power available for data center functions. Monitoring of these factors or other factors along with modification of data center functions allow the electric vehicle to support the data center while still operating as an electric vehicle without any significant impact to performance of the electric vehicle.

Figure 5A:
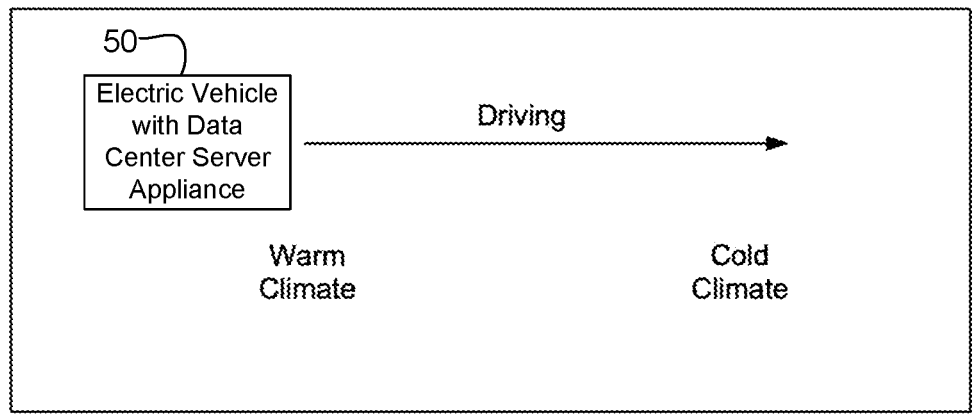
FIG. 5A illustrates the electric vehicle driving from a warm climate to a cold climate.
Figure 5B:
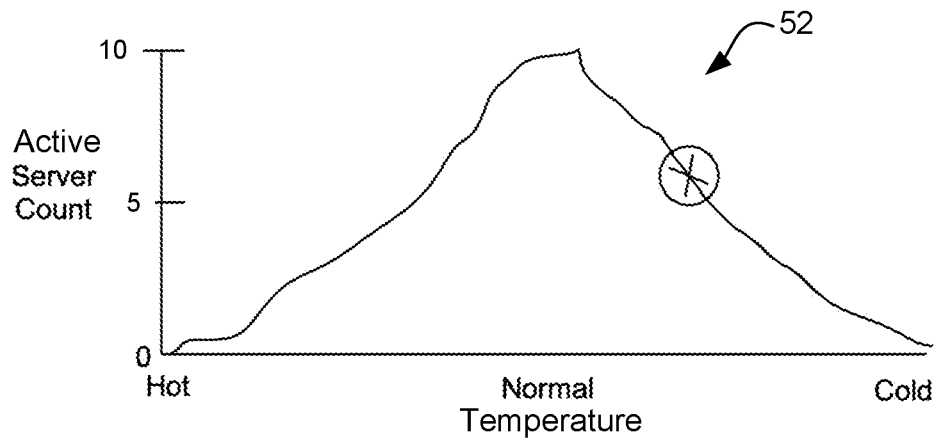
FIG. 5B is a graph illustrating an example of temperature distribution and active server count in the server appliance as the electric vehicle moves from the warm climate to the cold climate as shown in FIG. 5A.
Figure 5C:
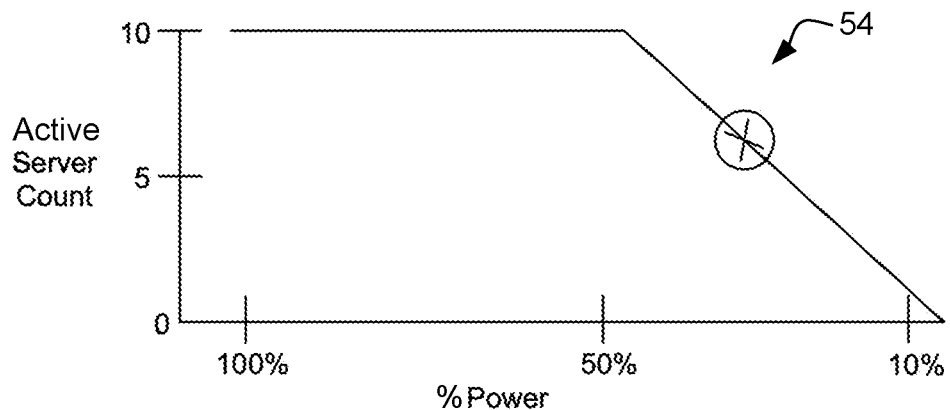
FIG. 5C is a graph illustrating an example of power distribution and active server count in the server appliance.

As illustrated in FIG. 5A, an electric vehicle 50 with a data center server appliance may travel from a warm climate to a cold climate (or vice versa). FIGS. 5B and 5C illustrate examples of temperature and power distribution, respectively, for the electric vehicle. FIG. 5B is a graph, generally indicated at 52, showing an example of active server count versus relative temperature (hot, normal, cold). During normal temperature operation, all ten servers may be in operation. The graph may be, for example, a probability density function (PDF). During hot or cold operating conditions, the server count may need to be reduced due to impact to power availability. The temperature at which servers may be turned off or turned on may be predefined or may be a relative temperature based on typical local temperature of the location where the vehicle spends a greatest percentage of time. FIG. 5C is a graph, generally indicated at 54, showing an example of active server count versus percentage available power at the electric vehicle battery. As the percentage of available power drops off, the server count is reduced. In one or more embodiments, machine learning may be used to identify an optimum shutdown point for active servers in a server appliance based on power and temperature derating, as indicated by the X on the graphs of FIGS. 5B and 5C.

Figure 6A:
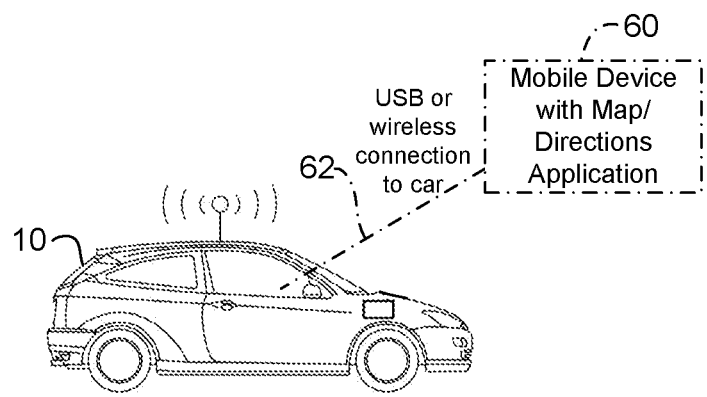
FIG. 6A illustrates a mobile device running a map application located in the electric vehicle for use in identifying a trip distance for the electric vehicle.
Figure 6B:
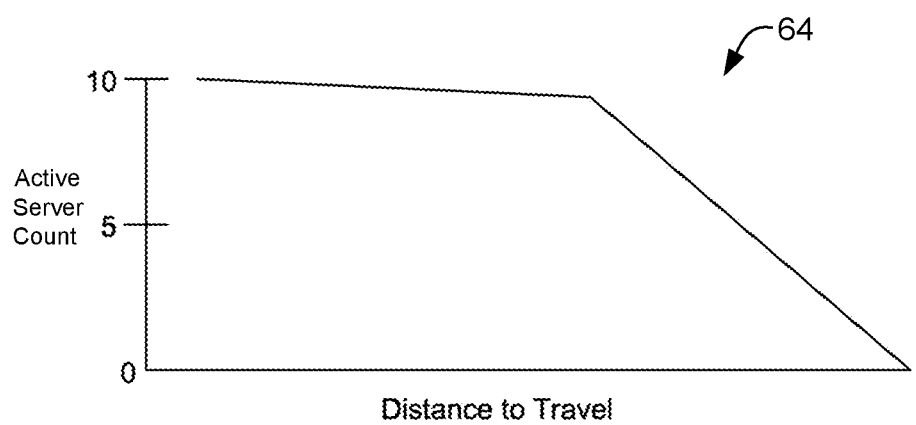
FIG. 6B is a graph illustrating an example of active server count based on a distance to travel.

As previously noted, server derating (reducing active number of servers) may also be performed based on distance to travel. As shown in FIG. 6A, a mobile device 60 (e.g., cellular phone, tablet, laptop, GPS (Global Positioning System)/direction system integrated into the electric vehicle, and the like) may be located within the electric vehicle 10. The mobile device 60 may be coupled to the car (e.g., with USB or wireless connection 62 or integrated directly into the electric vehicle). The mobile device 60 may be running a map (directions application) (or similar software) that may be used to indicate distance to travel. FIG. 6B is a graph, generally indicated at 64, showing an example of active server count versus distance to travel. As the distance to travel increases, the server count may be reduced to save power needed for the trip. The distance may be predefined, configured based on usage patterns, or user defined.

It is to be understood that the operating environments described herein are only examples and any number or type of conditions or factors may be used to determine when to turn off or turn on one or more of the servers in the server appliance. For example, active server count in the server appliance may be adjusted based on one or more of outside temperature, battery temperature, available power, driving distance/terrain/elevation changes, driver habits (performance), server temperature, server power requirements, number of servers required, server type/style, vehicle loading, or any combination of these or other factors. The server appliance may communicate any changes in server resources (change in number of active servers at the server appliance) to the cloud manager so that the cloud manager may reallocate resources.

Figure 7A:
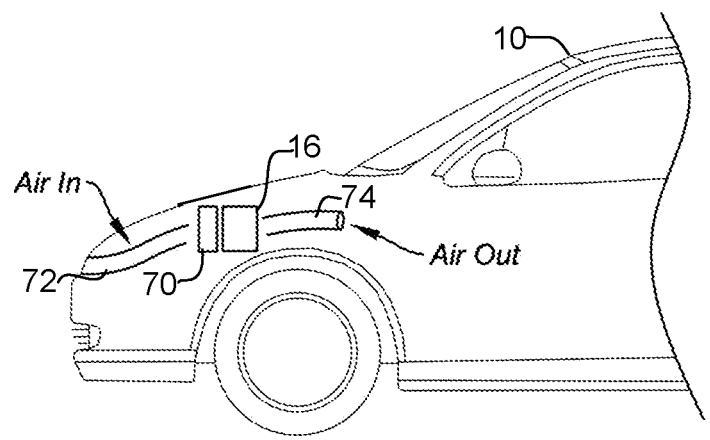
FIG. 7A illustrates an air inlet and fan for cooling the server appliance in the electric vehicle, in accordance with one embodiment.

In one or more embodiments, the server appliance 16 may be positioned in the electric vehicle 10 such that air flow passes through the server appliance while the electric vehicle is in motion, as shown in FIG. 7A. A fan tray 70 (comprising one or more fans and a fan controller) may be positioned adjacent to the server appliance 16. Cooling air is received from an air inlet 72 and exits through an air outlet 74. One or more of the fans may be turned off while the electric vehicle 10 is moving with cooling air passing through the electric vehicle. The fans may be turned on for stationary operation as needed.

Figure 7B:
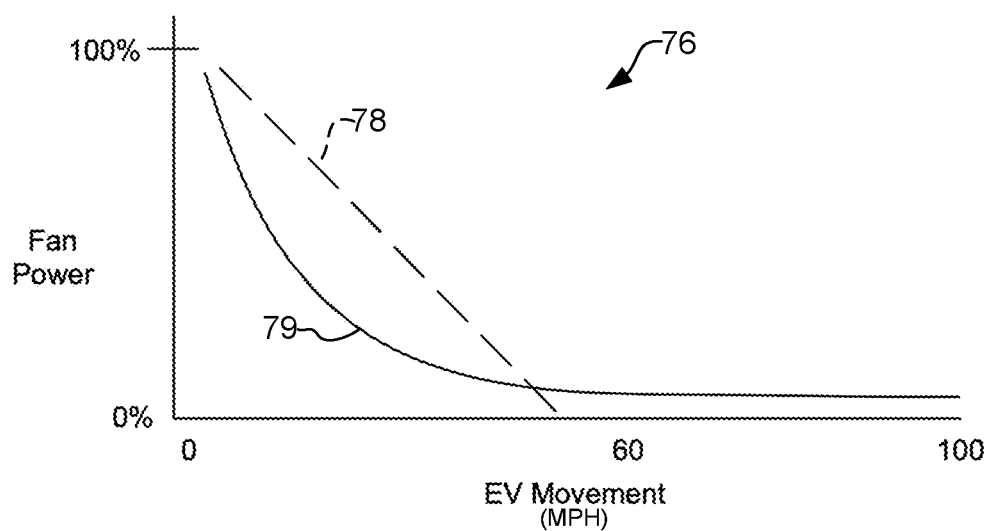
FIG. 7B is a graph illustrating an example of fan power as a function of electric vehicle movement.

FIG. 7B is a graph, generally indicated at 76, illustrating an example of fan power usage versus electric vehicle movement (miles per hour). Fan speed may be adjusted based on temperature and vehicle movement. The dashed line 78 illustrates a simple slope and the solid line 79 shows a complex slope (e.g., $1/e^x$). The relationship may also be expressed as an algebraic function. As the electric vehicle speed increases, the amount of fan power needed is reduced.

Figure 8:
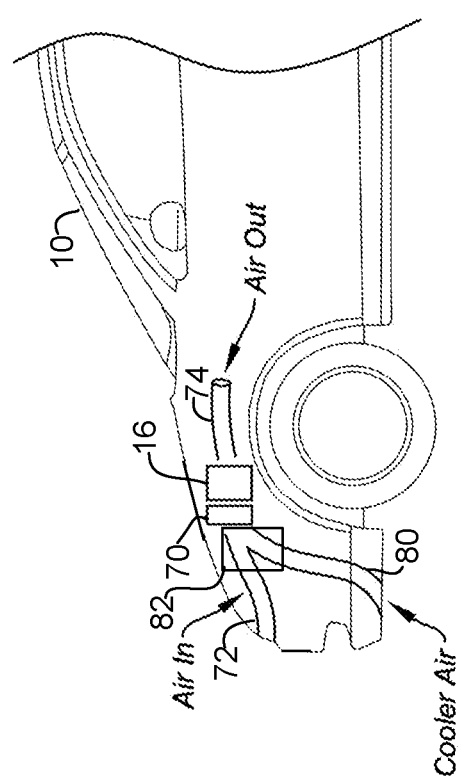
FIG. 8 illustrates a flow control damper for use in directing cooling air from different inlets to cool the server appliance, in accordance with one embodiment.

In a parked state, the air temperature under the electric vehicle is typically cooler. In one or more embodiments, a secondary air inlet 80 may be positioned to receive cooler air from an underside of the car 10, as shown in FIG. 8. A flow control damper 82 may be used to divert air to the fan from the air inlet 72, air inlet 80, or a combination thereof based on speed of the car 10. For example, high speed air may open the damper 82 to the air inlet 72 from the front of the electric vehicle 10 to allow high velocity air cooling from the front of the car. When the electric vehicle is in a stationary position, the damper 82 may automatically divert to the under car inlet 80, as this air is typically cooler. The damper 82 may close the front air inlet 72 in stationary mode. In another example, inlet 80 may be used to provide both forced air cooling and under-side cooler air. In one or more embodiments, cooling resources from the electric vehicle may also be used when the electric vehicle is stationary or in motion.

As previously noted, a cloud manager within the electric vehicle based cloud managed data center is used to manage the server appliances at the electric vehicles. As described below with respect to FIGS. 9A-10, the management functions may be distributed across any number of zone or regional cloud managers.

Figure 9A:
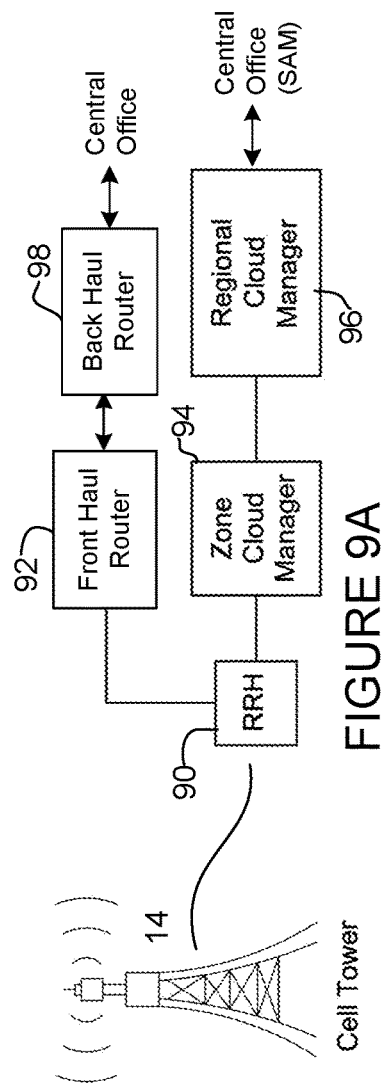
FIG. 9A is a block diagram of a cloud manager system for the electric vehicle based data center, in accordance with one embodiment.

FIG. 9A illustrates a cloud manager implementation for managing the electric vehicle based data center, in accordance with one embodiment. As shown in the example of FIG. 9A, the cell tower 14 comprises a remote radio head (RRH) 90, which is in communication with a front haul router 92 and a zone cloud manager 94. The remote radio head 90 provides the RF (Radio Frequency) circuit of the base station at the cell tower 14. The front haul router 92 is in communication with the remote radio head 90 and provides high-speed forwarding to meet radio transport requirements for radio access network operation. Any number of zone cloud managers 94 may be in communication with a regional cloud manger 96, as described below with respect to FIG. 10. In the example of FIG. 9A, there are two paths. A first path extends from the remote radio head 90 to the front haul router 92, to a back haul router 98, and to a central office. A second path extends from the remote radio head 90 to the zone cloud manager 94, to the regional cloud manager 96, and then to a SAM (Server Appliance Manager) at the central office. The cloud managers 94, 96 may be remotely located.

Figure 9B:
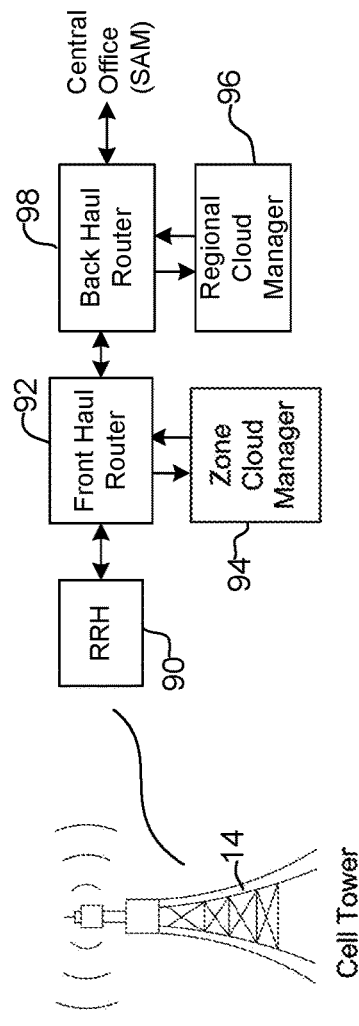
FIG. 9B is a block diagram of another cloud manager system for the electric vehicle based data center, in accordance with another embodiment.

FIG. 9B illustrates an alternative to the configuration shown in FIG. 9A in which an off-load engine is used for the server appliance zone manager 94 and regional cloud manager 96. In this example, the zone cloud manager 94 comprises an off-load API (Application Programming Interface) or service blade working with the front haul router 92. The regional cloud manager 96 also comprises an off-load API or service blade function working with the back haul router 98, which is in communication with the service appliance manager at the central office.

It is to be understood that the communication paths and components shown in FIGS. 9A and 9B are only examples and other components or arrangements may be used without departing from the scope of the embodiments.

Figure 9C:
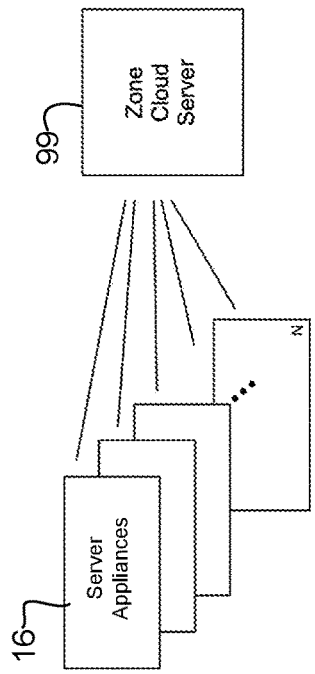
FIG. 9C is a block diagram of a zone cloud server in communication with a plurality of server appliances, in accordance with one embodiment.

As previously described, each zone may comprise any number of server appliances at any point in time. FIG. 9C illustrates an example of a zone cloud server 99 in communication with a plurality of server appliances 16 (1 . . . N).

In one example, each server appliance 16 comprises 10 servers. If N=100 electric vehicles with each electric vehicle comprising one server appliance with 10 servers, the total number of servers is one thousand. Thus, if there are one hundred electric vehicles within a zone, it is possible for one thousand dedicated servers to exist within a twenty-four hour period, for example. As previously noted, the electric vehicle based cloud data center may comprise any number of servers, which may change over time. For example, if a large number of trucks are located in a zone, the data center may comprise a greater number of servers. In one example, the electric vehicle based data center comprises at least one thousand servers.

In one example, 100 kWh is provided in a typical electric vehicle and cooling of ten servers is reasonable. Since electric vehicle charging costs are low and servers are owner maintained (e.g., owner upgraded or upgraded during maintenance interval by service personnel), it would not be difficult to send ten new model servers out for an electric vehicle owner to easily upgrade and the costs to maintain ten servers in an electric vehicle would be relatively low. It is to be understood that the number of servers in a server appliance, the number of service appliances in an electric vehicle, and the number of server appliances in a zone as described herein are only examples and a different number of servers or server appliances may be used, without departing from the scope of the embodiments.

Figure 10:
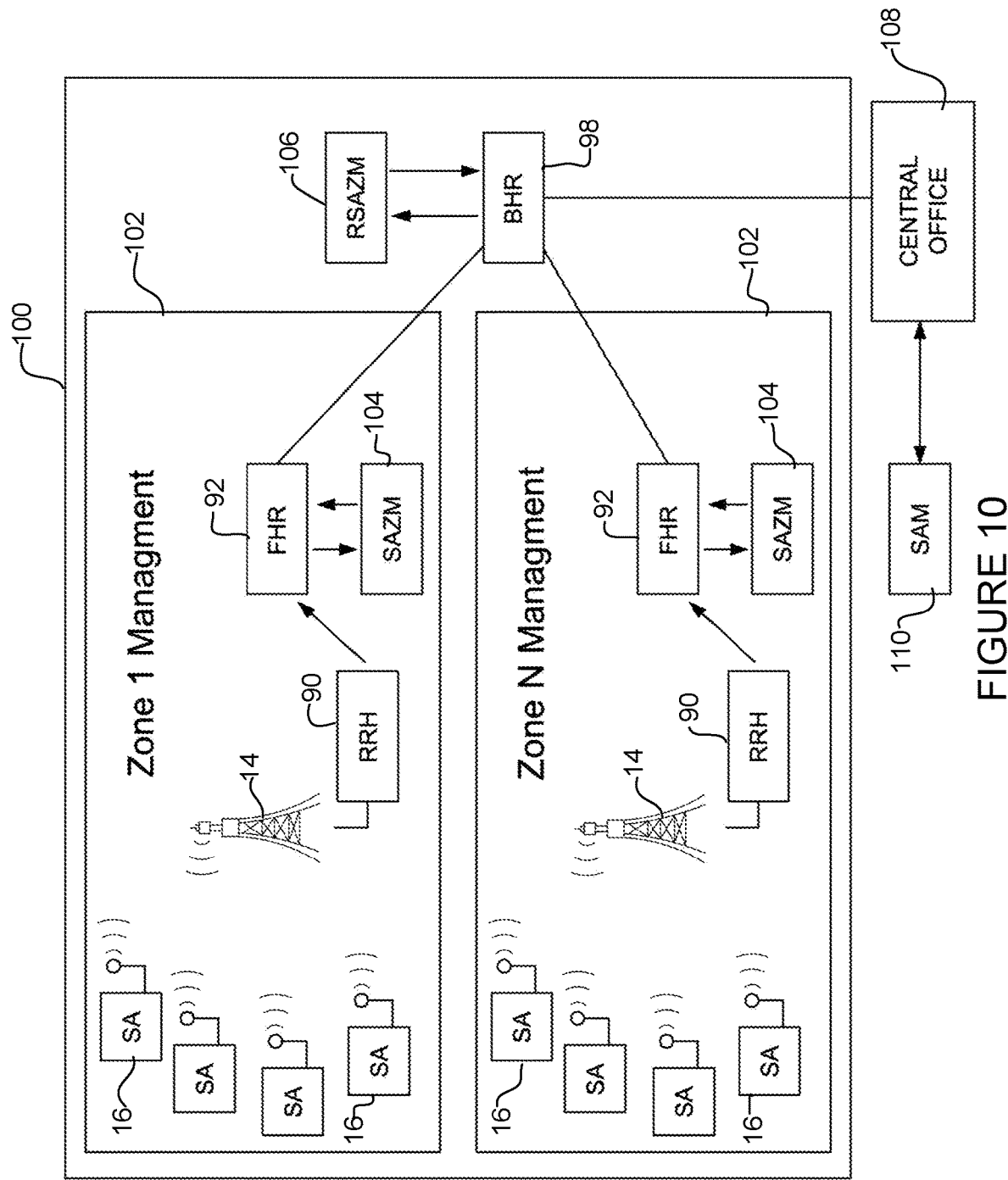
FIG. 10 is a block diagram of a server appliance manager system for managing server appliances in multiple zones, in accordance with one embodiment.

FIG. 10 illustrates an example of a server appliance cloud manager 100 for multiple zones 102 (zone 1 . . . zone N), in accordance with one embodiment. Each zone 102 includes a plurality of server appliances (SA) 16 in wireless communication with the cell tower 14. The remote radio head (RRH) 90 at the cell tower 14 is in communication with a front haul router (FHR) 92, as previously described. A server appliance zone manager (SAZM) 104 is in bidirectional communication with the front haul router 92. A back haul router (BHR) 98 communicates with the front haul routers 92 in different zones 102 and is also in communication with a regional server appliance zone manager (RSAZM) 106. The back haul router 98 communicates with a central office 108, which is in communication with a server appliance manager (SAM) 110. Each of the zones 102 may include any number of server appliances 16 and there may be any number of zones in communication with the back haul router 98 (back haul router region). There may be any number of back haul router regions in communication with the central office 108.

The server appliance zone manager 104 handles cloud coordination within a specific cell or wireless zone 102. The regional server appliance zone manager 106 handles cloud coordination data handoff between servers (server appliances 16) in one cell area or wireless zone 102 transferring data to servers in another cell area or zone. The server appliance manager 110 is essentially a master cloud coordinator for all servers within its cloud server domain. There may be multiple cloud server domains, logically isolated (or not isolated) from each other. The domains may be physically isolated based on zone or region demand, for example.

Figure 11:
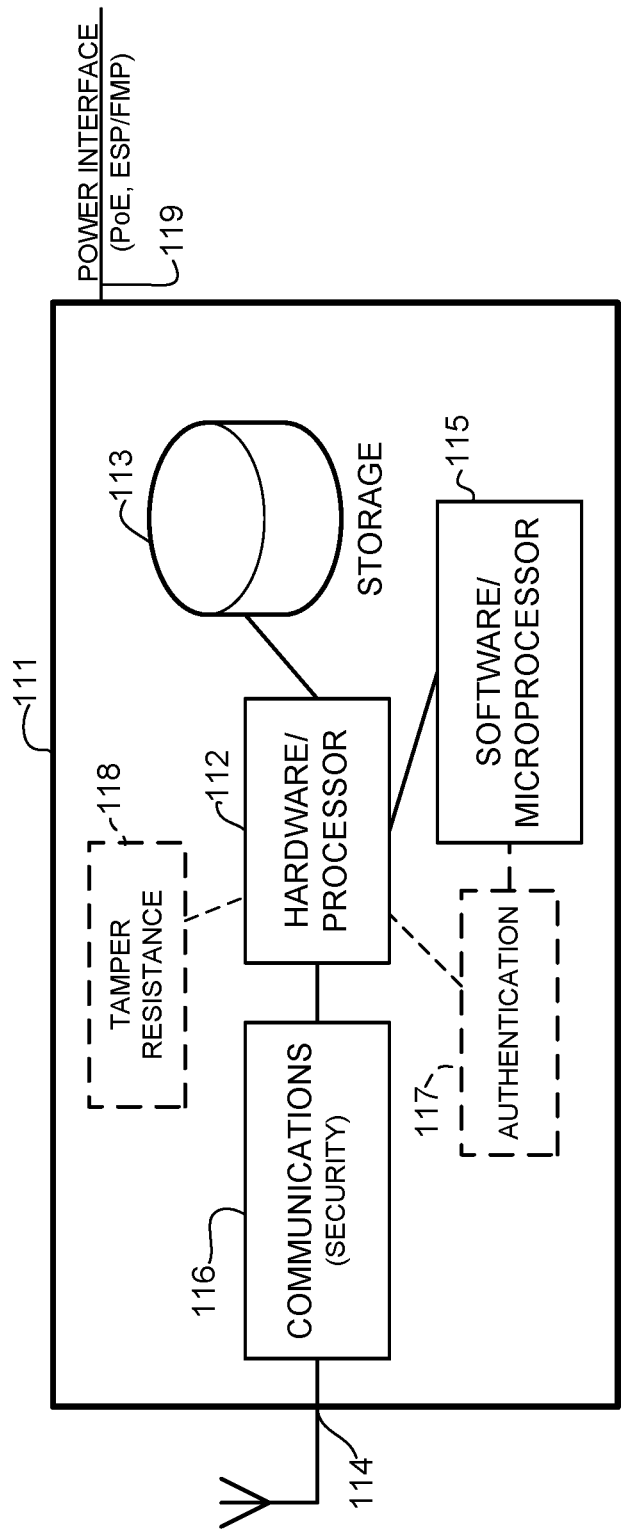
FIG. 11 is a block diagram depicting an example of a network device that may be used to implement the embodiments described herein.

FIG. 11 illustrates an example of a network device (server appliance) 111 that may be used to implement one or more embodiments described herein. In one or more embodiments, the network device 111 is a programmable machine that may be implemented in hardware, software, or any combination thereof. The network device 111 includes one or more processor 112 (e.g., hardware/processor), memory (local or cloud storage) 113, wireless interface 114, and software 115 (e.g., controller, authentication software, logic, microprocessor).

Storage 113 may be a volatile memory or non-volatile storage, which stores various applications, operating systems, modules, and data for execution and use by the processor 112. The network device 111 may include any number of memory components.

Logic (software, firmware, control logic, code) may be encoded in one or more tangible media for execution by the processor 112. For example, the processor 112 may execute codes stored in a computer-readable medium such as memory 113. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 111 may include any number of processors 112 or microprocessors. In one or more embodiments, components of the network device 111 may be configured to implement processes described below with respect to flowcharts of FIGS. 12A and 12B.

The network device 111 further includes one or more power interface 119 (e.g., primary, backup) to provide power to the server appliance from the electric vehicle battery. Power may be delivered directly from the battery or may be modified for delivery as PoE, ESP/FMP as previously described.

As shown in FIG. 11, the network device 111 may include one or more components to address security aspects. For example, the network device 111 may include a communications module 116 comprising one or more security features, hardware/software trust authentication module 117, and a tamper resistant device or mechanism 118.

It is to be understood that the network device 111 shown in FIG. 11 and described above is only an example and that different configurations of devices (with more or fewer components) may be used. For example, the network device 111 may further include any suitable combination of hardware, software, algorithms, processors, devices, components, or elements operable to facilitate the capabilities described herein.

Figure 12A:
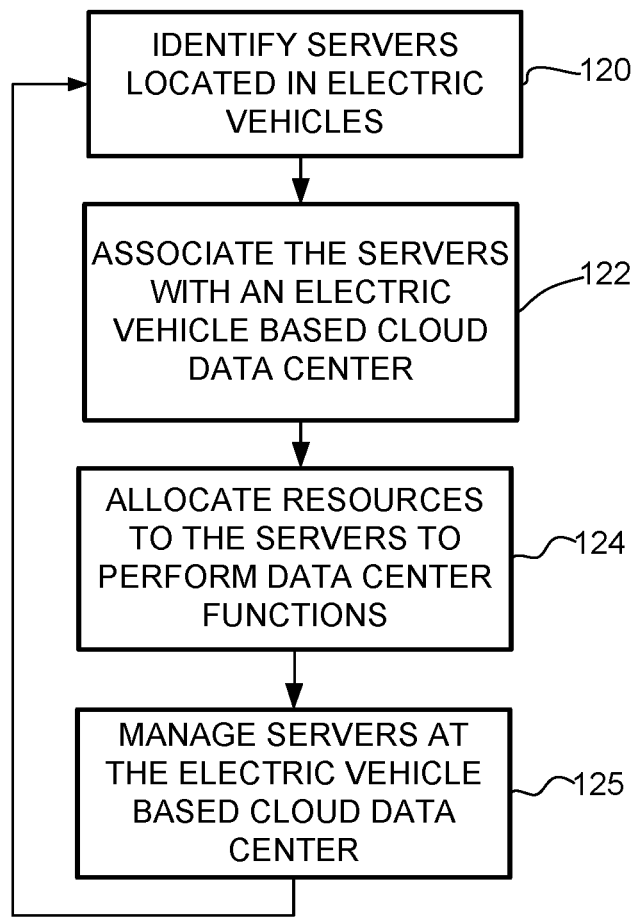
FIG. 12A is a flowchart illustrating an overview of a process for providing data center functions to support the electric vehicle based data center, in accordance with one embodiment.

FIG. 12A is a flowchart illustrating an overview of a process for supporting data center functions in the electric vehicle based cloud data center, in accordance with one embodiment. Servers located in the electric vehicles are identified at step 120. As previously described, this may comprise estimating a number of electric vehicles in a zone based on charging stations within the zone, for example. The servers are associated with the electric vehicle based cloud data center (step 122). As previously described, a data center zone cloud manager or zone cloud server may communicate with the servers located in the zone to associate the servers with the data center. Resources are then allocated to the servers to perform data center functions (step 124). The servers are managed at the electric vehicle based cloud data center (step 125), which may include reallocating resources as server resources at the electric vehicles change or electric vehicles move between zones. For example, the servers may be managed by the zone cloud manager, which is in turn managed by the regional cloud manager.

Figure 12B:
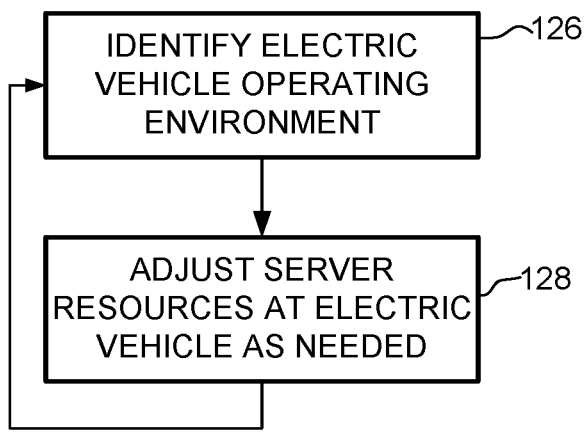
FIG. 12B is a flowchart illustrating an overview of a process for identifying an electric vehicle operating environment and adjusting server resources based on the operating environment.

FIG. 12B is a flowchart illustrating an overview of a process for adjusting server appliance operation based on an operating environment at the electric vehicle, in accordance with one embodiment. A vehicle operating environment (e.g., temperature, driving distance, available power, etc.) is identified at step 126. Server resources at the server appliance are adjusted (e.g., one or more servers turned on or off) as needed (step 128). As previously described with respect to FIGS. 5A-6B, active server count may be adjusted based on climate, expected driving distance, or any other factors.

It is to be understood that the processes shown in FIGS. 12A and 12B are only examples and that steps may be added or modified without departing from the scope of the embodiments.

As can be observed from the foregoing, one or more embodiments, which include incorporation of a server (e.g., server blade set) into an electric vehicle, are particularly advantageous in that they eliminate costs associated with conventional data centers including, for example, cost of land and building infrastructure, power requirements, back-up power generation, maintenance server updates, and wiring and cabling costs for a large number of server racks.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   identifying a plurality of servers located in a plurality of electric vehicles;
   estimating a server density within a zone of a plurality of zones based on a number of electric vehicle charging stations within the zone;
   associating said plurality of servers with an electric vehicle based cloud data center;
   allocating resources to said plurality of servers in the electric vehicle based cloud data center to perform data center functions; and
   managing said plurality of servers in the electric vehicle based cloud data center.

2. The method of claim 1 wherein allocating resources comprises calculating a percentage of the resources to allocate to said plurality of servers in the zone, wherein calculating said percentage of resources takes into account overlap of the zone with other zones of the plurality of zones.

3. The method of claim 1 wherein each of the electric vehicles comprises a server appliance comprising at least two of the servers, a router, and a wireless module for communicating with the electric vehicle based cloud data center.

4. The method of claim 1 wherein managing said plurality of servers comprises managing the servers within the zone at a zone cloud manager and coordinating data handoff between said plurality of servers in different zones of the plurality of zones at a regional cloud manager.

5. The method of claim 1, wherein managing said plurality of servers comprises reallocating resources to one or more of said plurality of servers within the zone in the electric vehicle based cloud data center as server resources at the electric vehicles within the zone change or as the electric vehicles move between zones of the plurality of zones.

6. A method comprising:
   identifying an operating environment at an electric vehicle comprising a plurality of servers operable to perform data center functions in an electric vehicle based cloud data center comprising a plurality of electric vehicle servers; and adjusting server resources at the electric vehicle based on said operating environment.

7. The method of claim 6 wherein adjusting said server resources comprises reducing or increasing a number of active servers in a server appliance at the electric vehicle.

8. The method of claim 6 wherein identifying said operating environment comprises identifying an operating temperature, and adjusting said server resources comprises adjusting a number of active servers at the electric vehicle based on said operating temperature.

9. The method of claim 8 wherein said operating temperature comprises one or more of a temperature outside of the electric vehicle, a battery temperature, or a server temperature.

10. The method of claim 6 wherein identifying said operating environment comprises identifying available power at an electric vehicle battery, and adjusting said server resources comprises adjusting a number of active servers at the electric vehicle based on said available power.

11. The method of claim 6 wherein identifying said operating environment comprises identifying driving conditions at the electric vehicle, and adjusting said server resources comprises adjusting a number of active servers at the electric vehicle based on said driving conditions.

12. The method of claim 11 wherein said driving conditions comprise one or more of an estimated trip distance, a driver performance, changes in terrain, or electric vehicle loading.

13. The method of claim 11 wherein said driving conditions comprise an estimated trip distance received from a map application on a mobile device located in the electric vehicle.

14. A method comprising:
identifying a plurality of servers located in a plurality of electric vehicles;
associating said plurality of servers with an electric vehicle based cloud data center;
allocating resources to said plurality of servers in the electric vehicle based cloud data center to perform data center functions; and
managing said plurality of servers in the electric vehicle based cloud data center,
wherein each of the electric vehicles comprises a server appliance comprising at least two of the servers, a router, and a wireless module for communicating with the electric vehicle based cloud data center.

15. The method of claim 14 further comprising:
estimating a server density within a zone of a plurality of zones based on a number of electric vehicle charging stations within the zone; and
allocating the resources to said plurality of servers in the electric vehicle based cloud data center based on the server density within the zone.

16. The method of claim 14 wherein allocating the resources comprises calculating a percentage of the resources to allocate to said plurality of servers in a zone of a plurality of zones, taking into account overlap of the zone with other zones of the plurality of zones.

17. The method of claim 14 wherein managing said plurality of servers comprises managing the servers within a zone of a plurality of zones at a zone cloud manager and coordinating data handoff between said plurality of servers in different zones of the plurality of zones at a regional cloud manager.

18. The method of claim 14 wherein managing said plurality of servers comprises reallocating resources to one or more of said plurality of servers within a zone of a plurality of zones in the electric vehicle based cloud data center as server resources at the electric vehicles within the zone change or as the electric vehicles move between zones of the plurality of zones.

19. The method of claim 14 further comprising:
identifying an operating environment at the electric vehicle; and
adjusting server resources at the electric vehicle based on said operating environment.

20. The method of claim 19, wherein identifying said operating environment comprises identifying one or more of an operating temperature, available power at an electric vehicle battery, or driving conditions at the electric vehicle, wherein adjusting said server resources at the electric vehicle comprises reducing or increasing a number of active servers in the server appliance at the electric vehicle based on one or more of said operating temperature, said available power at the electric vehicle battery, or said driving conditions.

* * * * *